United States Patent
Zabe

(10) Patent No.: US 12,422,023 B2
(45) Date of Patent: Sep. 23, 2025

(54) DEVICE FOR ADJUSTING A SPROCKET OF A CHAIN DRIVE

(71) Applicant: DEERE & COMPANY, Moline, IL (US)

(72) Inventor: Mickael Zabe, Ougney (FR)

(73) Assignee: DEERE & COMPANY, Moline, IL (US)

( * ) Notice: Subject to any disclaimer, the term of this patent is extended or adjusted under 35 U.S.C. 154(b) by 553 days.

(21) Appl. No.: 17/931,926

(22) Filed: Sep. 14, 2022

(65) Prior Publication Data

US 2023/0132573 A1    May 4, 2023

(30) Foreign Application Priority Data

Oct. 29, 2021 (DE) .......................... 102021128386.8
Oct. 29, 2021 (DE) .......................... 102021128389.2

(51) Int. Cl.
*F16H 7/06* (2006.01)
*A01F 15/08* (2006.01)
*F16H 55/30* (2006.01)

(52) U.S. Cl.
CPC ............. *F16H 7/06* (2013.01); *A01F 15/085* (2013.01); *F16H 55/303* (2013.01)

(58) Field of Classification Search
CPC ......... F16H 7/06; F16H 55/303; A01F 15/085
See application file for complete search history.

(56) References Cited

U.S. PATENT DOCUMENTS

| | | | |
|---|---|---|---|
| 2,127,031 A | | 8/1938 | Johnson |
| 2,343,084 A | | 2/1944 | Rich |
| 3,110,379 A | | 11/1963 | Baker, III |
| 3,597,988 A | * | 8/1971 | Hecketsweiler ........ F16H 55/30 |
| | | | 198/606 |
| 3,709,466 A | | 1/1973 | Dowrelio |
| 3,789,593 A | * | 2/1974 | Best .................... A01F 15/0765 |
| | | | 56/341 |
| 4,069,719 A | | 1/1978 | Cancilla |
| 4,299,318 A | | 11/1981 | Segawa |
| 6,272,825 B1 | | 8/2001 | Anderson et al. |
| 2006/0080836 A1 | * | 4/2006 | Hood ...................... A01F 15/18 |
| | | | 29/898.07 |
| 2017/0112321 A1 | * | 4/2017 | Brown ................ A47J 37/0786 |
| 2021/0039748 A1 | | 2/2021 | Braedt et al. |

FOREIGN PATENT DOCUMENTS

| | | | |
|---|---|---|---|
| CN | 201566850 U | * | 9/2010 |
| CN | 201640029 U | | 11/2010 |
| CN | 102192042 A | * | 9/2011 |

(Continued)

OTHER PUBLICATIONS

English translation of CN-201566850 (Year: 2010).*

(Continued)

*Primary Examiner* — Claude J Brown

(57) ABSTRACT

A device for adjusting a sprocket of a chain drive includes a bearing journal having a free end and a fixed end, a rotary bearing arranged on the bearing journal, and a sprocket guided on the rotary bearing. A stop is formed on the bearing journal and at least one spring element is arranged between the rotary bearing and the stop, wherein a preloading means is provided via a clamp which preloads the rotary bearing against the spring element.

20 Claims, 6 Drawing Sheets

(56) References Cited

FOREIGN PATENT DOCUMENTS

| | | | | | |
|---|---|---|---|---|---|
| CN | 208839667 | U | * | 5/2019 | |
| DE | 3134238 | A1 | | 8/1982 | |
| DE | 278610 | A1 | * | 5/1990 | |
| DE | 4238296 | A1 | * | 5/1994 | ........... B65G 47/261 |
| DE | 19632762 | A1 | | 2/1998 | |
| DE | 102020107416 | A1 | | 10/2020 | |
| EP | 2952089 | A1 | | 12/2015 | |
| GB | 189717578 | A | | 9/1897 | |
| GB | 190204923 | A | | 6/1902 | |
| GB | 191117241 | A | | 4/1912 | |
| GB | 191211381 | A | | 4/1913 | |
| GB | 115153 | A | | 5/1918 | |
| GB | 290718 | A | * | 5/1928 | ............. A01C 15/16 |
| KR | 19990008171 | U | * | 2/1999 | |
| KR | 200263252 | Y1 | * | 2/2002 | |
| KR | 20030078251 | A | * | 10/2003 | ................ F16H 9/12 |

OTHER PUBLICATIONS

English translation of KR-19990008171-U (Year: 1999).*
English translation of DD-278610-A1 (Year: 1990).*
English translation of CN-102192042-A (Year: 2011).*
English translation of KR-200263252-Y1 (Year: 2002).*
English translation of CN-208839667-U (Year: 2019).*
English translation of DE-4238296-A1 (Year: 1994).*
Extended European Search Report and Written Opinion issued in European Patent Application No. 22200452.5, dated Mar. 24, 2023, in 07 pages.
Extended European Search Report and Written Opinion issued in European Patent Application No. 22200451.7, dated Mar. 2, 2023, in 07 pages.

* cited by examiner

DEVICE FOR ADJUSTING A SPROCKET OF A CHAIN DRIVE

CROSS-REFERENCE TO RELATED APPLICATIONS

This application claims the benefit of German Patent Application DE 102021128386.8 filed on Oct. 29, 2021, and German Patent Application DE 102021128389.2 filed on Oct. 29, 2021, the disclosures of which are hereby incorporated by reference.

TECHNICAL FIELD

The disclosure generally relates to a sprocket adjuster for a chain drive, in particular for a chain drive for driving pressing rollers or pressing belts of a round baler for pressing crops.

BACKGROUND

The prior art discloses a multiplicity of round balers, with a distinction being drawn between round balers having a fixed pressing chamber and round balers having a variable pressing chamber. Round balers having a fixed pressing chamber are distinguished by the fact that a plurality of pressing rollers are arranged over the circumference of a defined cylindrical pressing chamber and delimit the pressing chamber in a circumferential direction. The cylindrical pressing space is delimited at the end sides by respective side walls. By contrast, round balers having a variable pressing chamber are distinguished by the fact that the cylindrical pressing space is delimited in the circumferential direction by one or more pressing belts, with the pressing belt being guided over a plurality of rollers. The circumference of the pressing space is configured to be variable by positionally changing one or more rollers during the pressing operation. The cylindrical pressing space is likewise delimited at the end sides by respective side walls. It is also known that both the pressing rollers of a round baler having a fixed pressing chamber and the rollers of a round baler having a variable pressing chamber can be driven or caused to rotate via a chain drive. Such chain drives are arranged on a frame of the round baler on one or both side walls outside of the pressing space. Here, the chain drive comprises a plurality of toothed wheels or sprockets which are connected to the pressing rollers or to rollers, with the sprockets being in drive connection via one or more drive chains.

Such a round baler is known from DE 196 32 762 A1, for example. A drive device for the pressing rollers, which delimit a pressing chamber, of a round baler is shown therein, with a plurality of chain drives being provided. The individual chain drives each serve for driving a partial number of the overall pressing rollers to be driven, with drive sprockets for driving the individual chain drives being able to be driven jointly. The sprockets intended for driving the pressing rollers are arranged on a circular arc in a lateral housing part of the round baler and the chain drives are mounted parallel to one another.

A further round baler from the prior art is shown in EP 2 952 089 A1, in which a plurality of pressing rollers are arranged around a pressing chamber and bear sprockets driven by a chain drive with a common chain. At least one of the sprockets and the associated pressing roller have interacting guide means, in the form of a shaft external toothing on the pressing roller and a hub internal toothing, interacting therewith, on the sprocket, which connect the sprocket and the pressing roller in a form-fitting manner in a direction of rotation and allow a movement of the sprocket in the axial direction of the pressing roller. Also provided are means for fixing the axial position of the sprocket in the form of a shaft nut, which is fastened to the pressing roller stub, and an external toothing engaging therewith. The configuration of the pressing rollers and sprockets that is disclosed here is suitable for drive-transmitting sprockets, but proves to be cost-intensive and complicated to manufacture. However, it does not satisfy the requirement of axial adjustability of the sprockets for the purpose of fine adjustment within the chain drive.

In the case of the aforementioned chain drives, it is customary for the chain to be guided from a drive sprocket to the sprockets which are to be driven of the pressing rollers, with, on the one hand, a chain guide with a plurality of windings and loop-like guidance of the chain being required, in particular to allow pivoting of the pressing rollers in order to open the pressing chamber. On the other hand, such a chain drive has to be held in tension. To make this possible, a chain drive of the aforementioned type has, in addition to the sprockets to be driven, further sprockets arranged therein which, within the chain drive, for the purpose of the aforementioned chain guidance, serve as deflection sprockets or guide sprockets and/or as sprockets for tensioning the chain drive. These further sprockets are freewheeling and are usually guided on a rotary bearing which is mounted on a bearing journal, which extends from the frame of the round baler, or is mounted on a bearing journal of a chain-tensioning device. Such freewheeling sprockets must also be subject to axial fine adjustment in order to lie precisely in the run of the chain. The fine adjustment of the sprockets mounted on the bearing journals usually occurs by means of spacer disks which are mounted on both sides of the end sides of the rotary bearing on the bearing journal, as is known, for example, from the mountings of the chain drives on a John Deere round baler of the F441 R type. This method of axial fine adjustment often proves to be very time-consuming and can occasionally require the multiple mounting and demounting of the sprocket on the bearing journal. The application of the above-described solution for fine adjustment of driven sprockets is unsuitable or not practicable for the axial fine adjustment of a freewheeling sprocket guided on a rotary bearing.

SUMMARY

According to the disclosure, a device or sprocket adjuster of the type stated at the outset is formed in such a way that a stop is formed on the bearing journal and at least one spring element is arranged between the rotary bearing and the stop, wherein a clamp is arranged which preloads the rotary bearing against the spring element. The arrangement of a spring element between the stop and the rotary bearing on the one hand and also the arrangement of the clamp which preloads the rotary bearing against the spring element allows precise axial displacement of the rotary bearing by means of simple adjustment of the clamp. The clamp is preferably arranged on the free end of the bearing journal and brace the rotary bearing against the spring element. The spring element preferably takes the form of a compression element which builds up a spring tension by means of compression. The preloading which can be set by the clamp on the spring element is preferably chosen in such a way that the range of flexibility or the deformation of the spring element is not completely used up, but a certain spring tension has been built up. This results in the fact that, by increasing the preloading, the rotary bearing is moved further in the direction of the spring element or in the direction of the fixed end of the bearing journal. By reducing the preloading, on the other hand, the rotary bearing is moved by the spring element in the direction of the free end of the bearing journal. Axial fine adjustment of the sprocket is thus made possible regardless of a thickness of a spacer disk. There is no need for laborious demounting of the sprocket or of the rotary bearing from the bearing journal in order, for example, to place a thicker or thinner spacer disk between the sprocket and frame.

The stop can be formed on the fixed end of the bearing journal, that is to say that it can be formed by the bearing journal-carrying component itself. In this case, the spring element would, on the one hand, be supported against the bearing journal-carrying component and, on the other hand, against the rotary bearing if no further components, such as, for example, spacer sleeves or spacer disks, are arranged between the spring element and the stop or the rotary bearing.

However, the stop is preferably defined by a shaft shoulder which is incorporated on the bearing journal between the rotary bearing and the fixed end. In this case, the spring element is supported against the shaft shoulder if no further components, such as, for example, spacer sleeves or spacer disks, are arranged between the spring element and the shaft shoulder or the rotary bearing.

The stop may, for example, also be formed by a snap ring which is held in an annular groove formed on the bearing journal between the rotary bearing and the fixed end.

It is also possible for the stop to be formed by a threaded nut which is arranged on an external thread formed on the bearing journal between the rotary bearing and the fixed end of the bearing journal. There would thus be provided an adjustable stop, with the result that the axial adjustment travel of the rotary bearing or of the sprocket is additionally variable by adjusting the threaded nut.

The clamp may comprise a clamping plate fastened to the free end of the bearing journal, wherein the rotary bearing is clamped on the bearing journal between the clamping plate and the spring element. The clamping plate may, for example, be fastened to the free end of the bearing journal by means of a clamping screw, wherein the clamping screw is received by an internal thread formed on the free end of the bearing journal. The rotary bearing is thus clamped on the bearing journal between the shoulder or spring element and the clamping plate.

The clamp may alternatively comprise a threaded nut arranged on an external thread at the free end of the bearing journal, wherein the rotary bearing is clamped on the bearing journal between the threaded nut and the stop or spring element.

The clamp may further comprise one or more spacer elements which are arranged between the clamping plate and the rotary bearing or between the threaded nut and the rotary bearing. The stated spacer elements make it possible for the device to be adapted to the size of the rotary bearing and also to the geometry of the spring element. The spacer elements can take the form of a bush, sleeve or disk.

The spring element preferably takes the form of a cup spring. Here, one or more cup springs arranged in a row can be provided in order to optimize the spring travel and/or the spring tension. Instead of cup springs, there can also be used other spring elements which produce a spring tension by means of compression.

The above-described device or sprocket adjuster is particularly suitable for use in a chain drive for driving pressing rollers or pressing belts of a round baler for pressing crops. Here, the device can be used on one or more sprockets of the chain drive.

The aforementioned chain drive is able to be used in a wide variety of types of agricultural machines in which rolls, rollers, drums or other rotating bodies have to be driven. However, it is particularly suitable for use in a round baler having a frame, a pressing space and pressing rollers or pressing belts which are arranged on the frame and surround the pressing space and are intended for pressing crops, wherein the chain drive is arranged on the frame and/or a side wall of the round baler for driving the pressing rollers or the pressing belt.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
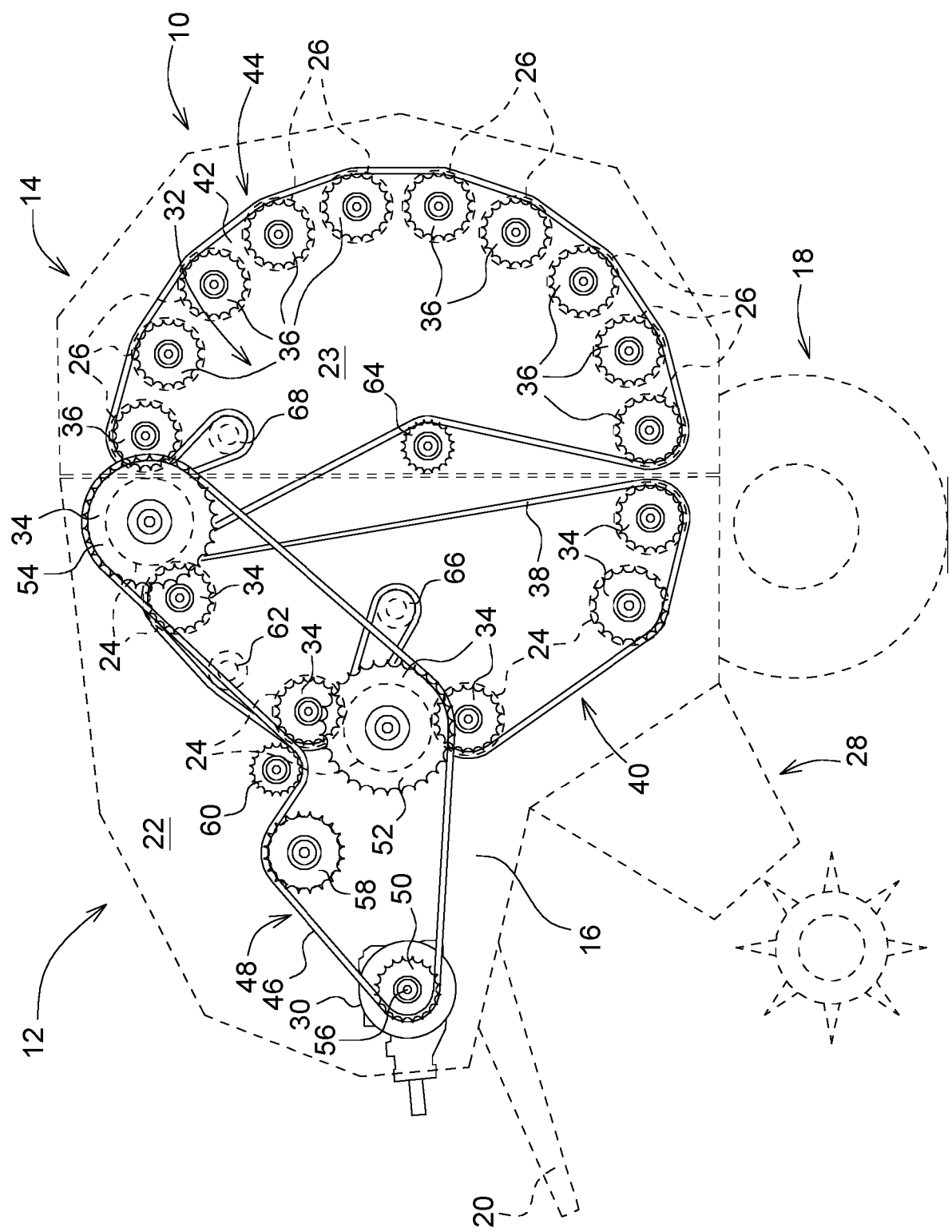
FIG. 1 is a schematic side view of a round baler having a chain drive for driving pressing rollers.

Referring to the Figures, wherein like numerals indicate like parts throughout the several views, a round baler is generally show at 10 in FIG. 1. The round baler 10 includes a front part 12 and a rear part 14.

The round baler 10 further includes a frame 16, a running-gear unit 18, a drawbar 20, side walls 22 on the front part 12, side walls 23 on the rear part 14, pressing rollers 24 on the front part 12, pressing rollers 26 on the rear part 14, a feed assembly 28 for receiving a crop, and a drive device 30.

The frame 16 consists of struts and the like which hold together and support the aforementioned components and thus form the front part 12 into a unit The running-gear unit 18 is composed, in a manner which is not indicated in more detail, of an axle and of wheels mounted thereon which are situated in the lower rear region of the front part 12 and support the entire round baler 10 such that it can move on the ground.

The drawbar 20 serves for connecting the round baler 10 to a towing vehicle, for example to an agricultural tractor, and is fixedly connected to the frame 16.

The side walls 22, 23 are also fixedly connected to the frame 16 and terminally close off a pressing chamber 32. For this purpose, the side walls 22, 23 assume a distance from one another and movably receive the pressing rollers 24 and 26. In the upper rear region of the front part 12 there is provided a bearing (not shown) which serves for the vertically pivotable connection of the rear part 14. The side walls 22, 23 are connected to one another by cross-struts, which are not indicated in further detail but are sufficiently well known.

The pressing rollers 24 and 26 are composed in a known manner of a sheet-metal shell and of a shaft or shaft stubs. The center points of the pressing rollers 24 and 26, that is to say their axes of rotation, are situated substantially on a part of a circle which surrounds the pressing chamber 32. On at least one side of the round baler 10, on the outer side of the side walls 22, 23, sprockets 34 are provided on the pressing rollers 24 at the front part 12, and sprockets 36 are provided on the pressing rollers 26 at the rear part 14. The sprockets 34 of the pressing rollers 24 are surrounded by a drive chain 38 of a first chain drive 40. The sprockets 36 of the pressing rollers 26 are surrounded by a drive chain 42 of a second chain drive 44. A further drive chain 46 of a third chain drive 48 serves for driving the first and second chain drive 40 and 44. The third chain drive 48 is driven by a main drive sprocket 50 which is connected to the drive device 30. The third chain drive 48 drives a first drive sprocket 52 which serves for driving the first chain drive 40. The third chain drive 48 additionally also drives a second drive sprocket 54 which serves for driving the second chain drive 44. The first and second drive sprocket 52 and 54 are each double-toothed, with a first toothing of the first drive sprocket 52 and a first toothing of the second drive sprocket 54 being connected to the third chain drive 48. A second toothing of the first drive sprocket 52 is connected to the first chain drive 40 and drives the latter. A second toothing of the second drive sprocket 54 is connected to the second chain drive 44 and drives the latter.

The drive device 28 is, in a manner which has not been shown, fed by the towing vehicle, for example via an articulated shaft, and contains a transversely extending shaft 56 in the rear region of the drawbar 20. Emanating from the shaft 56 is the main drive sprocket 50 which drives the third chain drive 48.

The chain drives 40, 44 and 48 are guided over additional sprockets 58, 60, 62, 64 and tensioned by means of tensioning devices, which are not indicated in more detail. Furthermore, a sprocket 66 is provided for the first chain drive 40 and a sprocket 68 is provided for the second chain drive 44 for guiding or deflecting the respective drive chains 38, 42.

FIGS. 2 to 6 each show sprocket adjusters or devices 70 for adjusting the additional sprockets 58, 60, 62, 64, 66 and 68, with the sprockets 58, 60, 62, 64, 66 and 68 each being arranged on a bearing journal 72 of such a device 70. In addition to the bearing journal 72 and one of the sprockets 58, 60, 62, 64, 66 and 68 to be adjusted, the device 70 comprises a rotary bearing 74, which is arranged on the bearing journal 72, and the sprocket 58, 60, 62, 64, 66 and 68 guided on the rotary bearing 74. The bearing journal 72 comprises a free end 76 and a fixed end 78. The latter is fastened to the frame 16, to the side walls 22, 23 or to a tensioning arm 80 of a tensioning device (not indicated in more detail). The fastening of the bearing journal 72 can occur in a demountable (releasable) manner in any desired form or in a non-releasable manner, for example by means of welding or by means of a connection produced in the casting or forging process of the tensioning arm 80. The bearing journal 72 has a stop 82 which can be formed in a variety of ways, as illustrated in FIGS. 2 to 5.

Figure 2:
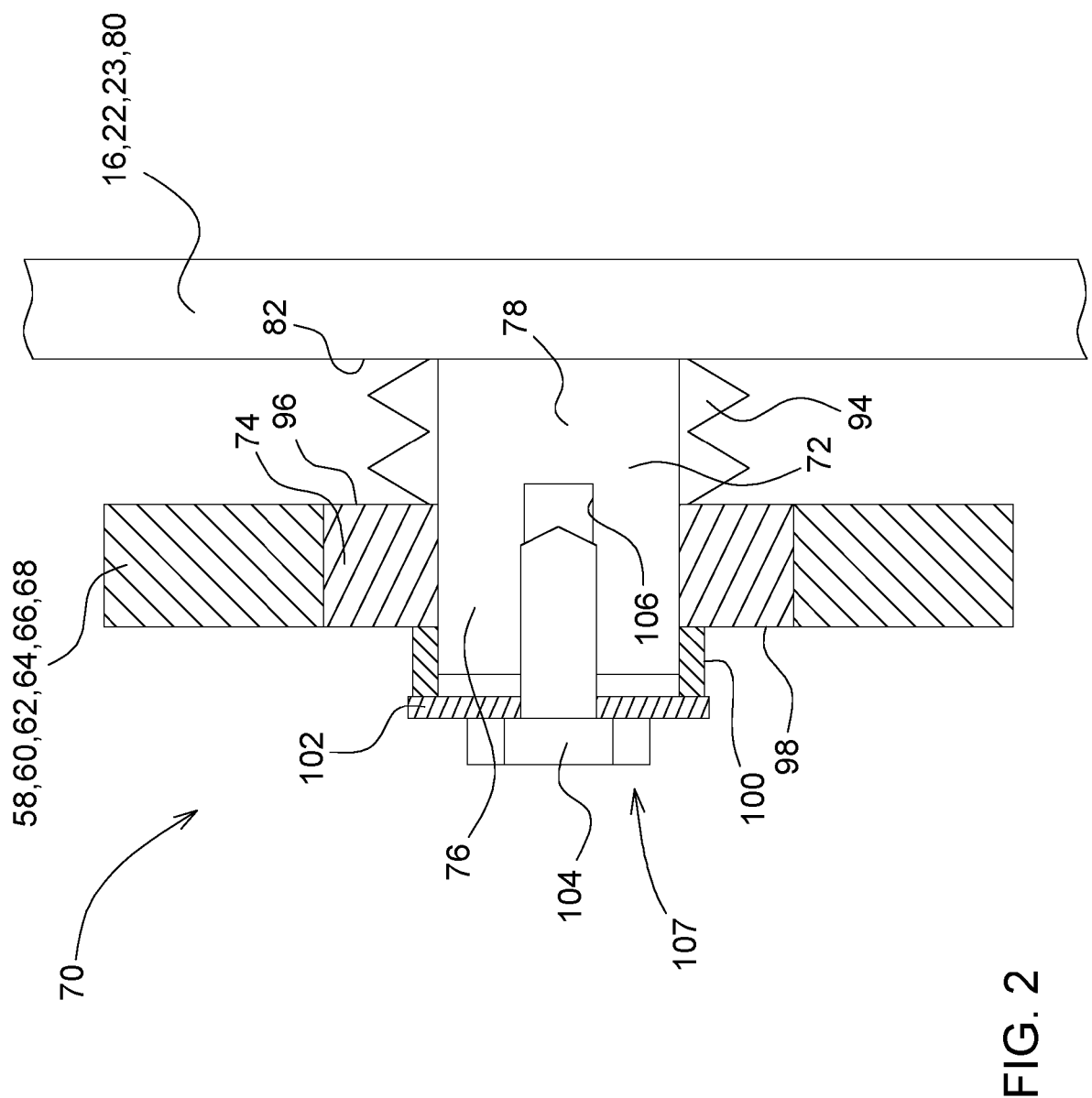
FIG. 2 is a schematic cross-sectional view of a sprocket adjuster for adjusting a sprocket of the chain drive from FIG. 1.

According to FIG. 2, the stop 82 is formed by the component carrying the bearing journal, here the frame 16, the side walls 22, 23 or the tensioning arm 80 of a tensioning device.

Figure 3:
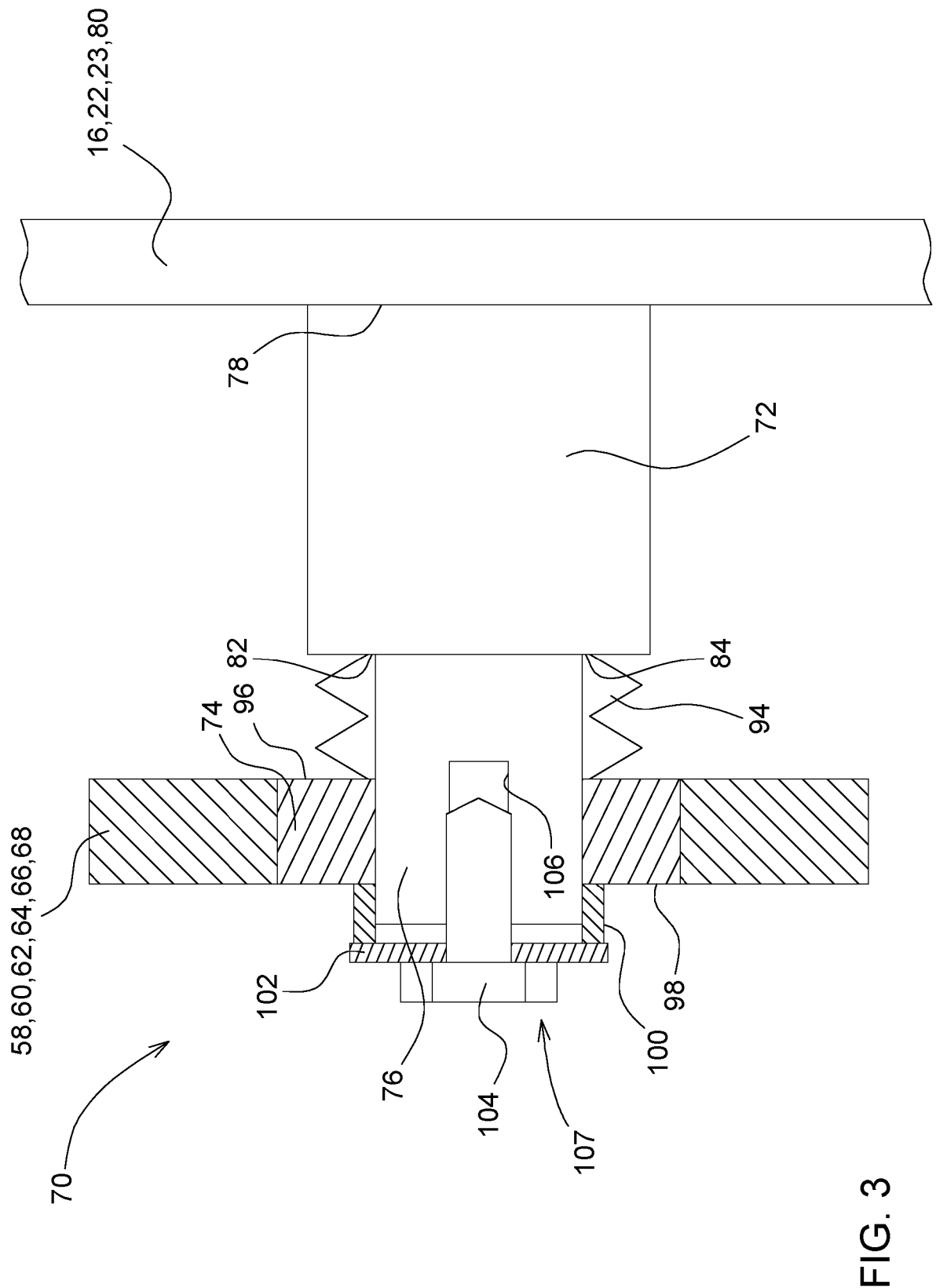
FIG. 3 is a schematic cross-sectional view of an alternative form of a device for adjusting the sprocket of the chain drive from FIG. 1.

According to FIG. 3, the stop 82 can also be formed by a shaft shoulder 84 formed on the bearing journal 72.

Figure 4:
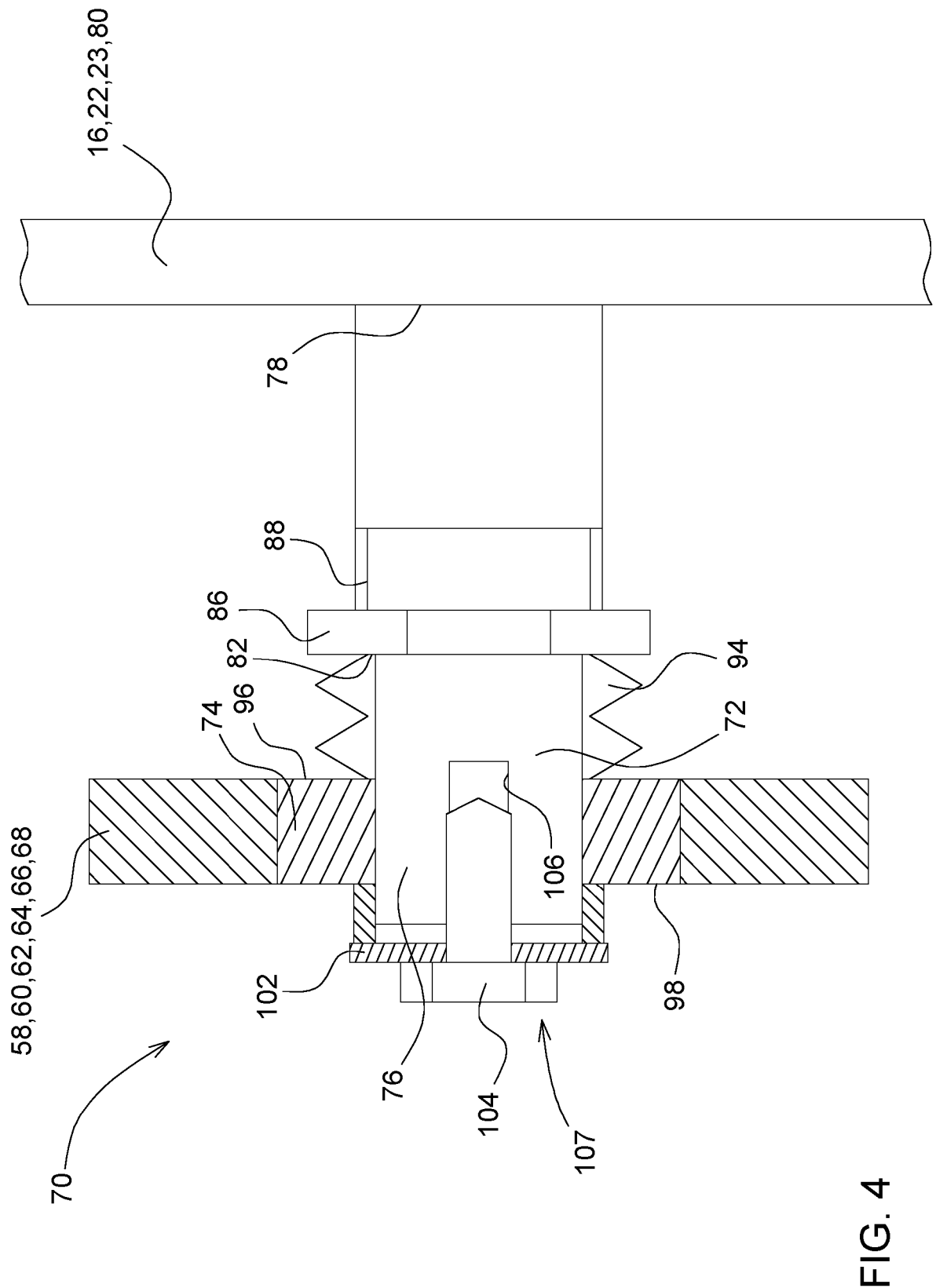
FIG. 4 is a schematic cross-sectional view of a further alternative form of the sprocket adjuster for adjusting the sprocket of the chain drive from FIG. 1.

According to FIG. 4, the stop 82 is formed by a threaded nut 86 which is guided on an external thread region 88 on the bearing journal 72 between the rotary bearing 74 and the fixed end 78 of the bearing journal 72.

Figure 5:
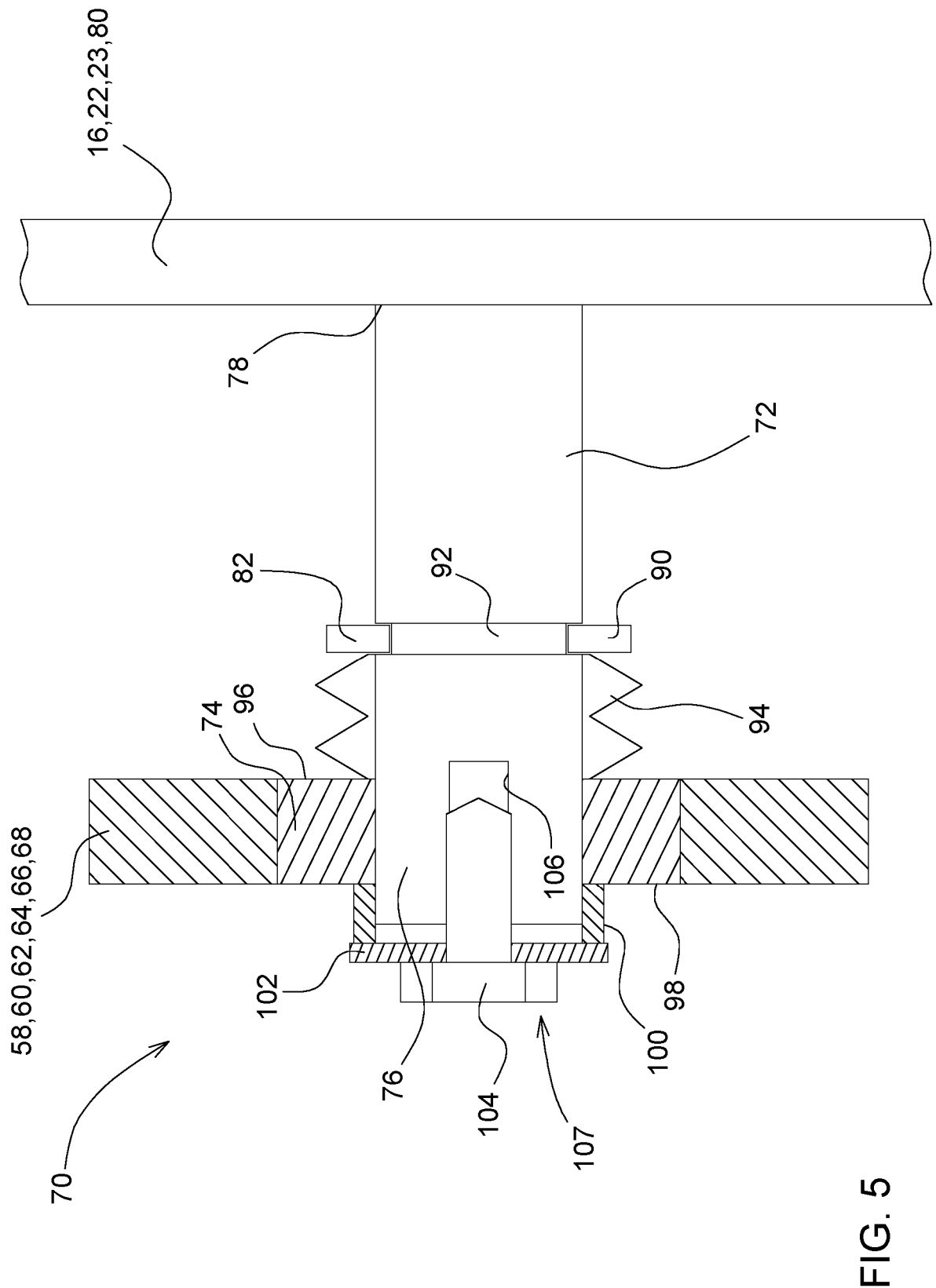
FIG. 5 is a schematic cross-sectional view of a further alternative form of the sprocket adjuster for adjusting the sprocket of the chain drive from FIG. 1.

According to FIG. 5, the stop 82 is formed by a snap ring 90 which is guided in an annular groove 92 on the bearing journal 72 between the rotary bearing 74 and the fixed end 78 of the bearing journal 72.

As is shown in FIGS. 2 to 6, spring elements 94 in the form of cup springs are arranged between the rotary bearing 74 and the respective stop 82 and are supported, on the one hand, on the stop 82 and, on the other hand, on an end face 96 of the rotary bearing 74 that faces the fixed end 78 of the bearing journal 72.

On an opposite end face 98 of the rotary bearing 74 there adjoins a spacer element 100 which is pressed by a clamping plate 102 against the end face 98 of the rotary bearing 74. The clamping plate 102 is held by a clamping screw 104 or pressed against the spacer element 100. The clamping screw 104 is guided in an internal thread 106 formed on the free end 76 of the bearing journal 72.

According to FIGS. 2 to 5, preloading means via a clamp 107 is thus provided by the internal thread 106, the clamping screw 104, the clamping plate 102 and the spacer element 100. The rotary bearing 74 is clamped between the spacer element 100 and the spring element 94 and preloading is produced by clamping the clamping screw 104 against the clamping plate 102 or against the spacer element 100 in collaboration with the spring element 94 or with compression of the cup springs. Depending on the degree of clamping, the rotary bearing 74 is moved axially in the one or the other direction along the bearing journal 72, with the degree of clamping or the preloading being variable by screwing in or unscrewing the clamping screw 104 and it thus being possible to bring about an axial adjustment of the rotary bearing 74 and of the sprocket 58, 60, 62, 64, 66, 68 guided thereon.

Figure 6:
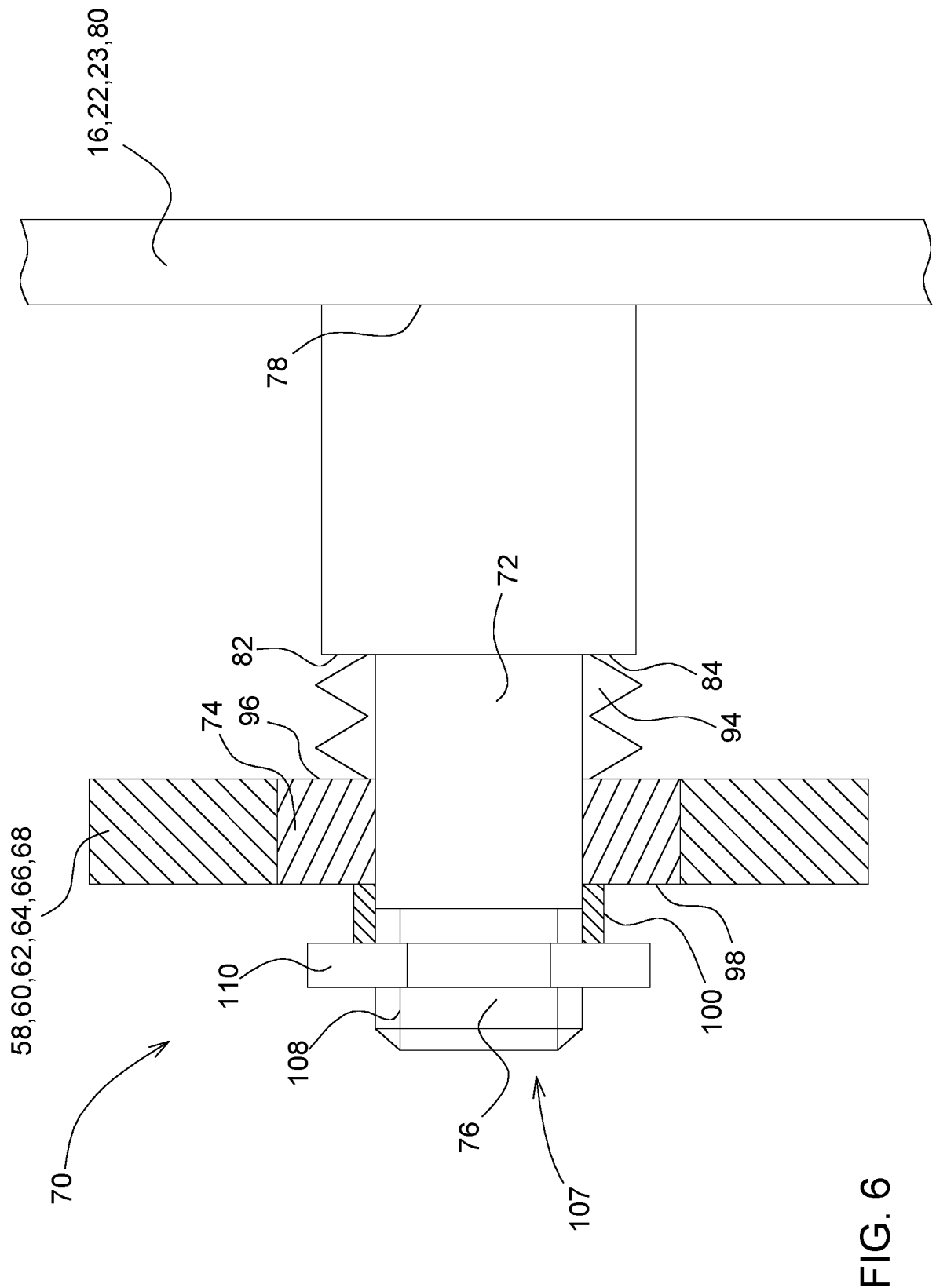
FIG. 6 is a schematic cross-sectional view of a further alternative form of the sprocket adjuster for adjusting the sprocket of the chain drive from FIG. 1.

In an alternative embodiment, which is depicted in FIG. 6, the clamp 107 is provided, in relation to the internal thread 106, the clamping screw 104 and the clamping plate 102 from FIGS. 2 to 5, by an external thread 108 formed on the free end 76 of the bearing journal 72 and by a threaded nut 110 guided thereon, with the spacer element 100 being pressed against the end face 98 by the threaded nut 110. Here, the external thread 108, in collaboration with the threaded nut 110 and the spacer element 100, display the same technical effect as the above-described clamp 107 from FIGS. 2 to 5.

The spacer elements 100 shown in the exemplary embodiments are provided in the form of a spacer sleeve or a spacer bush. The spacer elements 100 can here also take the form of spacer disks or washers. Furthermore, it is by all means conceivable that spacer elements 100 are also provided between the spring element 94 and the end face 96 of the rotary bearing 74 or else the stop 82.

In the case of the exemplary embodiment shown in FIG. 4, it is also conceivable that a spring element 94 is provided on the opposite end face 96 and that the preloading function is brought about by adjusting the threaded nut 86. In such a case, the arrangement of a spring element 94 on the end face 98 could be dispensed with and optionally be replaced by a spacer element 100 on this side of the rotary bearing 74.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A chain drive for a work vehicle, the chain drive comprising:
   a journal having a free end and a fixed end;
   a rotary bearing arranged on the journal;
   a sprocket guided on the rotary bearing;
   a stop on the journal adjacent the fixed end of the journal;
   a spring element disposed between the rotary bearing and the stop; and
   a clamp attached to the free end of the journal and operable to preload the rotary bearing against the spring element, wherein the clamp is adjustable relative to the journal to change the preload between the rotary bearing and the spring element whereby an axial position of the rotary bearing and the sprocket along the journal is controllable.

2. The chain drive set forth in claim 1, wherein the stop is formed on the fixed end of the journal.

3. The chain drive set forth in claim 1, wherein the stop includes a shaft shoulder which is formed on the journal between the rotary bearing and the fixed end of the journal.

4. The chain drive set forth in claim 1, wherein the stop incudes a snap ring which is held in an annular groove formed on the bearing journal between the rotary bearing and the fixed end of the journal.

5. The chain drive set forth in claim 1, wherein the stop includes a threaded nut which is arranged on an external thread formed on the bearing journal between the rotary bearing and the fixed end of the bearing journal.

6. The chain drive set forth in claim 1, wherein the clamp includes a clamping plate fastened to the free end of the bearing journal, wherein the rotary bearing is clamped on the bearing journal between the clamping plate and the spring element.

7. The chain drive set forth in claim 6, wherein the clamp includes a spacer element which is arranged between the clamping plate and the rotary bearing.

8. The chain drive set forth in claim 1, wherein the clamp includes a threaded nut arranged on an external thread at the free end of the bearing journal, wherein the rotary bearing is clamped on the bearing journal between the threaded nut and the spring element.

9. The chain drive set forth in claim 8, wherein the clamp includes a spacer element which is arranged between the threaded nut and the rotary bearing.

10. The chain drive set forth in claim 1, wherein the spring element includes a cup spring.

11. The chain drive set forth in claim 1, further comprising a chain in meshing engagement with the sprocket.

12. A round baler for compressing crop material into a bale, the round baler comprising:
    a frame member;
    a journal having a fixed end attached to the frame member and cantilevered out from the frame member to a free end;
    a rotary bearing arranged on the journal;
    a sprocket guided on the rotary bearing;
    a chain in meshing engagement with the sprocket;
    a stop disposed on the journal adjacent the fixed end of the journal;
    a spring element disposed between the rotary bearing and the stop; and
    a clamp attached to the free end of the journal and operable to preload the rotary bearing against the spring element, wherein the clamp is adjustable relative to the journal to change the preload between the rotary bearing and the spring element whereby an axial position of the rotary bearing and the sprocket along the journal is controllable.

13. The round baler set forth in claim 12, wherein the stop includes a shaft shoulder formed on the journal between the rotary bearing and the fixed end of the journal.

14. The round baler set forth in claim 12, wherein the stop incudes a snap ring which is held in an annular groove formed on the bearing journal between the rotary bearing and the fixed end of the journal.

15. The round baler set forth in claim 12, wherein the stop includes a threaded nut which is arranged on an external thread formed on the bearing journal between the rotary bearing and the fixed end of the bearing journal.

16. The round baler set forth in claim 12, wherein the clamp includes a clamping plate fastened to the free end of the bearing journal, wherein the rotary bearing is clamped on the bearing journal between the clamping plate and the spring element.

17. The round baler set forth in claim 16, wherein the clamp includes a spacer element which is arranged between the clamping plate and the rotary bearing.

18. The round baler set forth in claim 12, wherein the clamp includes a threaded nut arranged on an external thread at the free end of the bearing journal, wherein the rotary bearing is clamped on the bearing journal between the threaded nut and the spring element.

19. The round baler set forth in claim 18, wherein the clamp includes a spacer element which is arranged between the threaded nut and the rotary bearing.

20. The round baler set forth in claim 12, wherein the spring element includes a cup spring.

* * * * *